Sept. 6, 1966 F. E. ROM 3,270,496
GASEOUS VORTEX REACTOR FOR A ROCKET MOTOR
Filed March 20, 1964 3 Sheets-Sheet 1

INVENTOR
FRANK E. ROM
BY
*GD O'Brien*
*Gene E. Shook*
ATTORNEYS

INVENTOR
FRANK E. ROM

United States Patent Office 3,270,496
Patented Sept. 6, 1966

3,270,496
GASEOUS VORTEX REACTOR FOR A ROCKET MOTOR
Frank E. Rom, Avon Lake, Ohio, assignor to the United States of America as represented by the Administrator of the National Aeronautics and Space Administration
Filed Mar. 20, 1964, Ser. No. 353,635
10 Claims. (Cl. 60—35.5)

This application is a continuation-in-part of copending application Serial No. 47,119 which was filed August 20, 1960, now abandoned.

The invention described herein may be manufactured and used by or for the Government of the United States for governmental purposes without the payment of any royalties thereon or therefor.

This invention relates to a nuclear rocket propulsion system for a booster missile or spacecraft, and more particularly to a nuclear rocket wherein a gaseous fission vortex is formed within the combustion chamber of a rocket motor and a propellant, such as hydrogen, is passed through the vortex in order to obtain the highest specific impulse of the propellant as it is exhausted into the atmosphere or space through a conventional rocket nozzle.

As pointed out in this copending application, present propulsion systems for spacecraft comprise primarily so-called chemical rockets. Such rockets ordinarily use a combination of a liquid fuel and a liquid oxidant, such as hydrogen and oxygen, or hydrogen and fluorine chemically reacted in a combustion chamber and exhausted through a rocket nozzle in order to produce the thrust needed to propel the payload out of the atmosphere. The present chemical rockets have low specific impulses as compared with the nuclear rocket motor disclosed by this invention and therefore have a disadvantage of having exceedingly large assembled take-off weights. Specific impulse is defined in the art as the pounds of thrust produced for each pound per second of flow of a propellant through the rocket nozzle and for conventional chemical propellants such as gasoline-oxygen, it is about 250 pounds of thrust per pound per second of flow while the best chemical propellants, (i.e. hydrogen and oxygen or fluorine), have a specific impulse of about 400 pounds per pound per second flow. With such relatively low specific impulses, the best chemical rockets available have an assembled take-off weight for manned moon landing and return missions on the order of 200 to 300 pounds per pound of payload even with all the stages utilizing high energy fuels.

The present invention overcomes, as does the nuclear rocket motor disclosed in U.S. patent application, Serial No. 260,085 filed February 20, 1963, and entitled "An Improved Nuclear Rocket Motor," now abandoned, the disadvantages of low specific impulses of the chemical rocket since nuclear energy which has about 2 million times the energy of chemical propellants is utilized to heat an ideal rocket propellant that is ejected through a conventional convergent-divergent De Laval rocket nozzle. The present invention uses the best rocket propellant which is one with the lowest molecular weight since it can be ejected through a nozzle at the highest velocity for a given area ratio and temperature—that is hydrogen.

The solid fuel element reactor disclosed in the nuclear rocket motor in the above-mentioned copending U.S. patent application, Serial No. 260,085, is limited in its performance by temperature restrictions of the fuel elements. The propellant in that application is heated by contact with the hot reactor structure containing the fissionable fuel, thus limiting the maximum temperature to that at which the structural material—in this case tungsten 184—can maintain its shape. Since the highest material melting point for tungsten 184 is around 6000° F., the likelihood of propellant temperatures exceeding or even reaching 6000° F. is rather remote.

The present invention overcomes this disadvantage of the solid fuel-carrying structure of the nuclear rocket motor by utilizing nuclear fuel which is gaseous, and by mixing with the propellant it becomes a means for heating propellant to temperatures in the range of 15,000° to 20,000° R. thereby creating specific impulses around 3000 seconds. The present invention also overcomes the disadvantages found in the so-called "cavity-type" of gaseous nuclear reactors which have been previously proposed as propulsion rocket motors. The chief disadvantage of this previously proposed type of reactor was that the fissionable material being intimately mixed with the propellant was ejected through the nozzle before even a very small fraction of the fuel was fissioned. This led to a prohibitive rate of fissionable material consumption that made a propulsion system utilizing such a straight-through gaseous reactor completely impractical. A practical gaseous nuclear rocket motor must, as does the present invention, retain or hold up the uranium or other fissionable gas in the cavity by some force field so that a larger fraction can be fissioned.

The gaseous vortex reactor of the present invention utilizes the fundamental principle of inertia operating in a strong centrifugal force field. The force field holds a uranium gas cloud in the reactor where it is fissioned while the propellant gas flows through the cloud. The hydrogen is heated as it passes through the fissioning gas cloud and is then ejected through a rocket nozzle with the fraction of uranium gas that is lost. The centrifugal force field is produced by injecting the propellant and uranium gas tangentially into the cylindrical chamber of a cavity reactor, thereby creating a strong vortex. The uranium gas atoms being heavier than the hydrogen atoms of the propellant have a larger outward radial force acting on them and therefore permit the hydrogen gas to pass through the uranium gas. The net result is that the uranium gas has a longer hold-up time in the reactor than the hydrogen; therefore, a much larger fraction of the uranium gas is fissioned before it finally passes out of the reactor. The thrust of the rocket motor is produced by ejecting the mixture of hydrogen gas and the fraction of the uranium gas which is lost through a rocket nozzle.

The object of the present invention, therefore, is to provide a propulsion system for booster and space vehicles having higher specific impulse than conventional chemical rockets.

Another object of the invention is to provide a propulsion system for booster and space vehicles having a higher specific impulse than solid core nuclear reactor rocket motors.

Another object of the invention is to provide a nuclear powered rocket having high specific impulse and power capability for sustained trips in space.

A further object of the invention is to provide an improved cavity-type nuclear rocket motor.

A still further object of the invention is to provide a nuclear rocket motor for interplanetary travel which is reliable, controllable, and of low weight with a high specific impulse.

A still further object of the invention is to provide a nuclear reactor rocket propulsion system for space probe vehicles capable of propelling a payload from the earth's surface wherein the assembled take-off weight per pound of payload is small in comparison with the chemical rocket powered propulsion systems.

Other objects and many of the attendant advantages of the present invention will be apparent from the following detailed description when taken together with accompanying drawings in which.

Figure 1:
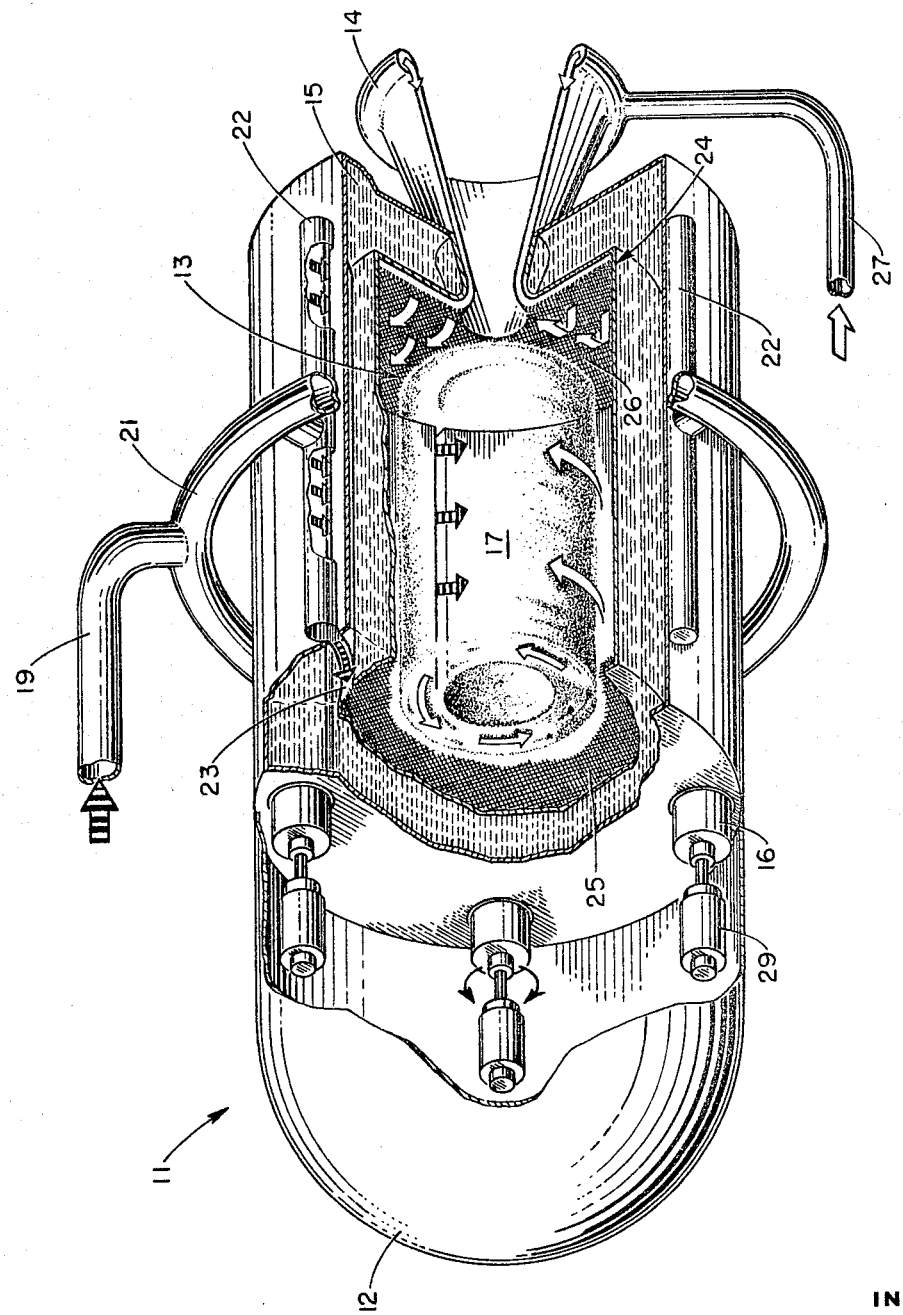
FIG. 1 is a pictorial cutaway view of a nuclear rocket motor embodying the present invention.

Referring now to the drawings wherein like reference characters designate like or corresponding parts throughout the several views, there is shown in FIG. 1 a nuclear rocket motor 11 comprising an outer shell or housing 12, enclosing a reactor core or combustion chamber 13, and having rigidly attached to the shell 12 and the reactor core or combustion chamber 13 a rocket convergent-divergent exhaust nozzle 14.

As previously described above, a gaseous vortex is formed of fissionable material in an annular cylindrical form such as the core 17 illustrated in FIG. 1. The core 17 is formed by tangential injection of a liquid propellant, such as hydrogen, and fissionable fuel, such as fully enriched uranium 235 or plutonium 239, from a storage and pump system (not shown) through a conduit 19 into an annular manifold 21. Injector tubes 22 spaced circumferentially around the combustion chamber 13 connect the manifold 21 with the combustion chamber 13 by tangentially-formed slots 23 in the housing 24 having end walls 25 and 26.

In order to regeneratively cool the rocket nozzle 14, an additional supply of hydrogen propellant is fed to the nozzle 14 from a storage and pump means (not shown) through a conduit 27. The propellant passes through the double-wall rocket nozzle 14 through the end walls 25 and 26 cooling the walls and the rocket nozzle prior to the passing of the hydrogen through the gaseous core 17, thus limiting damage from excessive heat due to heat transfer. The moderator for the reactor motor is heavy water 15 contained in the volume between the shell 12 and housing 24. In order to control the chain reaction within the vortex 17, a plurality of control rods 16 are spaced circumferentially around the reactor core and emerged in the heavy water 15 moderator material. The rods 16 are composed of a neutron-absorbing material concentrated longitudinally along one side of $D_2O$ filled tubes made of a non-absorbing material. Control motors 29 rotate the tubes 16 in response to any common detection device (not shown) mounted on the outside of the shell 12 or other parts of the space vehicle so that in the event the reactor core 17 should become supercritical, the motors 29 would be energized to turn the neutron-absorbing material toward the core 17 to reduce the reactivity. When the sensing device has indicated the reaction rate to have been brought to the desirable limit, the motors 29 would, in turn, turn the non-absorbing parts of the tubes 16 toward the core 17.

Figure 3:
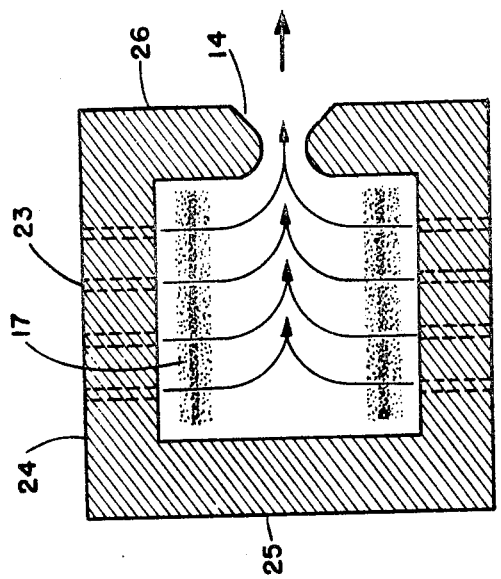
FIG. 3 is a schematic longitudinal view of a combustion chamber for a rocket motor using the concept of the present invention.
Figure 2:
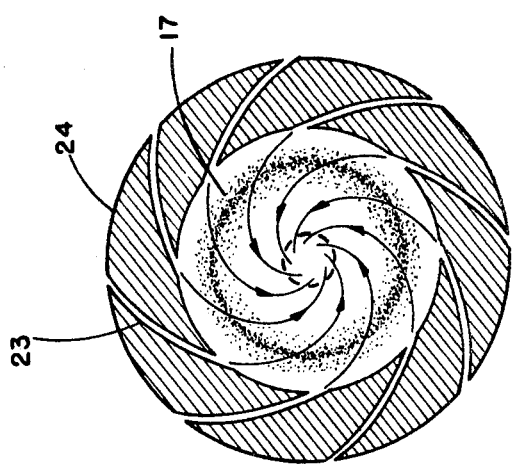
FIG. 2 is a schematic cross-sectional view of the combustion chamber of a rocket motor embodying the present invention.

With particular reference to FIGS. 2 and 3 wherein a schematic sketch of the reactor core 17, rocket nozzle 14, and the housing 24 are shown, both the propellant hydrogen and the gaseous fissionable uranium or plutonium material are injected into the reactor core 17 through a plurality of tangential passages 23 whereby a vortex in the core 17 creates a centrifugal force acting upon the mixture of hydrogen and uranium or plutonium gas. By utilizing the inertia of the materials, the rapid radial acceleration of the gas mixture which occurs in a vortex is resisted by each of the gases to a different degree because of the difference in molecular weight of the gaseous materials hydrogen and uranium. The result is that the heavy gas of uranium or plutonium accelerates less than the hydrogen; thus this gas has a longer hold-up time in the vortex chamber and forms in a ring-like structure designated 17 in the FIGS. 2 and 3. The heavy molecules of the uranium or plutonium present what is essentially a fissioning cloud through which the light molecules of the hydrogen must diffuse.

Another description of the process is as follows: Because the gas mixtures are traveling in a circular path, a centrifugal force acts on the mixture. Since the heavier gas atoms of the uranium fissionable material have more inertia and it takes a greater force to deflect them into the path of a given radius, a steeper radial pressure gradient in the heavy gas of uranium than in the light gas of hydrogen is set up. This means that the light gas flows through the heavy gas in the radial direction. The high uranium or plutonium concentration toward the outside of the vortex is opposed by the net inward radial component of flow in the cavity. The balance between the radial flow and the centrifugal action thus establishes a zone of high uranium or plutonium concentration 17 which is held away from the walls of the housing 24. The hydrogen flowing from the regeneratively-cooled rocket nozzle 14 is flowed through the porous inner walls of the housing 24 and the ends 25 and 26 to achieve the cooling of these walls.

The hydrogen propellant introduced through the tangential slots 23 in the housing 24 plus the hydrogen which is introduced as a coolant through the regeneratively-cooled rocket nozzle 14 is intimately mixed with the fissionable gas in the ring 17 and as the critical conditions of the core 17 are obtained, the fission energy is imparted directly to the propellant. Thrust is produced as the propellant passes through the nozzle 14.

Parameters which illustrate the performance of either a laminar or turbulent flow case for the gaseous core reactor are shown in the following table:

| Parameter | Flow | |
|---|---|---|
| | Laminar | Turbulent |
| Hydrogen-to-fuel flow-rate ratio | 100 | 100 |
| Average uranium density, particles/cc | $0.46 \times 10^{18}$ | $0.55 \times 10^{18}$ |
| Vortex outer radius, $r_o$, ft | 5.5 | 4.8 |
| Reactor-cavity length-to-diameter ratio, L/D | 2 | 2 |
| Specific impulse, sec | 3,000 | 3,000 |
| Thrust, lb | 530 | 330 |
| Flow rate, lb./sec | 0.177 | 0.11 |
| Reactor thrust-to-weight ratio | $1.23 \times 10^{-3}$ | $<1 \times 10^{-3}$ |
| Power, M.W. | 35 | 22 |

Start up is achieved by initially feeding only hydrogen into the conduit 19 and then adding fuel to the hydrogen in ever increasing amounts until criticality is achieved. The parameter governing fuel consumption is the hydrogen-to-fuel flow-rate ratio during operation. The upper limit of this ratio is estabished by hydrodynamic as well as nuclear considerations. If this ratio is too large, the fuel concentrations necessary for criticality may not be achieved. A hydrogen-to-fuel flow-rate ratio of 100 to 1 has been found to be satisfactory for both flow conditions shown in the above table.

While lower values for the hydrogen-to-fuel flow-rate ratio may be used, consumption of nuclear fuel is not the only factor involved in the lower limit of the propellant-to-fuel flow-rate ratio. As the fuel-to-hydrogen atom ratio increases, the average molecular weight of the exhaust gas increases in a like manner, and an upper limit of fuel concentration is reached when the increase in the average molecular weight begins to decrease the specific impulse significantly. The 100 to 1 hydrogen-to-fuel flow-rate ratio used in the above table will produce an increase of approximately 1% in the propellant molecular weight. A resulting one-half percent decrease in specific impulse does not represent a serious limitation on performance, and the flow-rate ratio of 100 to 1 insures optimum results.

Both gaseous vortex nuclear reactors of the above table operate at a pressure which is adequate for criticality, and the maximum pressure in the reactor cavity is 500 atmospheres. Another consideration in the nucleonics of gaseous reactors is the gamma and neutron heating of the solid materials, such as the shell 12 and housing 24, surrounding the reactor cavity as well as the moderator, such as the heavy water 15. The fraction of the total power generation which results from gamma and neutron heating, as well as thermal radiation to the cavity walls, must be removed from these materials by the hydrogen before it enters the reactor cavity. The resulting enthalpy rise of the hydrogen adjacent these materials in the gaseous reactor cannot exceed the total rise possible to a solid-core reactor system, and this determines the maximum possibe enthalpy gain available to the hydrogen in a gas-core system. If the combined effects of nuclear and thermal radiation result in the dissipation of ten percent of the total power in the surrounding materials, and if the hydrogen enters the reactor cavity 13 at about 5000° R., a maximum exhaust temperature in the range of 15,000° to 20,000° R. is produced. Temperatures in this range will produce specific impulses of approximately 2000 to 3000 seconds. It will be appreciated that higher specific impulses may be obtained by using a radiator to dissipate heat from the surrounding materials.

Figure 4:
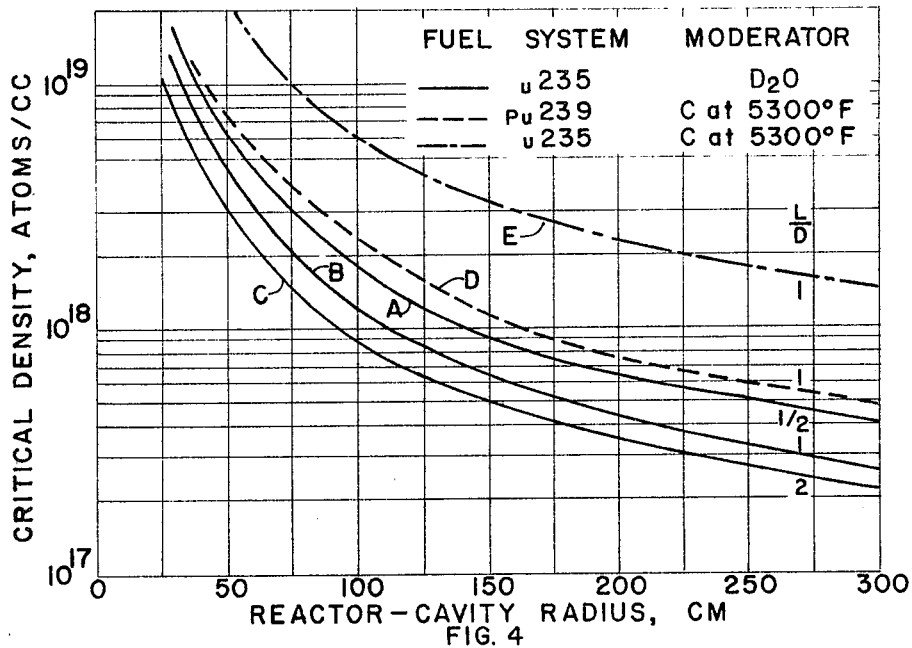
FIG. 4 is a graph illustrating the critical density of a gaseous core nuclear reactor as a function of the reactor cavity radius for various length-to-diameter ratios, fuels and moderators.

For given values of critical fuel density and maximum operating pressure, the hydrodynamic relations prescribe a maximum hydrogen flow rate per unit cavity length. For a fixed hydrogen flow rate per foot of vortex length, an increase in reaction length results in an increase in thrust but a smaller increase in reactor weight up to a length-to-diameter ratio of 2. This value is used in the above table in order to obtain a near optimum thrust-to-weight ratio. Because the reactor geometry also affects the criticality requirement as shown in FIG. 4 and described more fully below, the reactor radius and length-to-diameter ratio cannot be varied independently for a given average fuel density. Near optimum performance results from a length-to-diameter ratio of 2 and the smallest radius necessary to maintain criticality.

FIG. 4 shows the critical density of a gaseous core nuclear reactor as a function of reactor cavity radius $r_0$ for various length-to-diameter ratios, fuels and moderators. This ratio is one-half for curve A, one for curve B, and two for curve C, and these criticality requirements are for a cylindrical reactor cavity uniformly filled with uranium 235 and completely surrounded by a 70° F. heavy water ($D_2O$) moderator-reflector region. The thickness of this moderator-reflector region is 100 centimeters. Curve D shows critical density as a function of the length-to-diameter of a plutonium 239 fuel cavity with a 5300° F. graphite moderator, while curve E illustrates the criticality of a uranium 235 fuel cavity surrounded by graphite at 5300° F. The length-to-diameter of both curves D and E is one.

Figure 5:
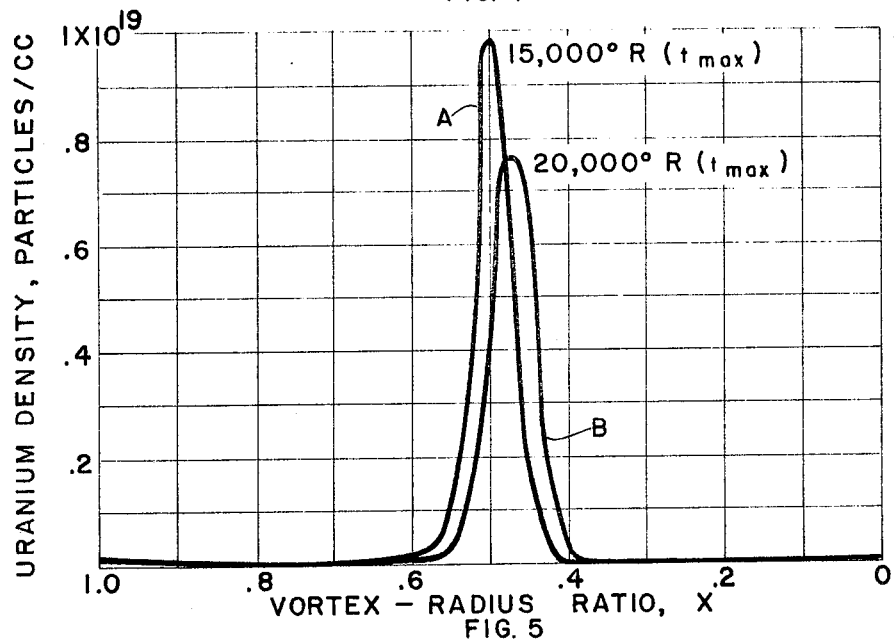
FIG. 5 is a graph showing the uranium density distribution in a gaseous core nuclear reactor.

As stated above the hydrogen enters the cavity at about 5,000° R., and this temperature increases as the hydrogen flows towards the center of the core 17 until an exhaust temperature in a range of 15,000° to 20,000° R. is reached at the center of the vortex. The uranium density distribution for a typical laminar flow situation is shown in FIG. 5. Concentration profiles are shown for a 15,000° R. maximum temperature by curve A and a 20,000° R. maximum temperature by curve B. In this graph the uranium density is plotted against the vortex-radius ratio (X) which is equal to $r/r_0$, where $r$ is the radius of the vortex and $r_0$ is the vortex outer radius.

Obviously, many modifications and variations of the present invention are possible in the light of the above teachings. It is, therefore, to be understood that within the scope of the appended claims the invention may be practiced other than as specifically described.

What is claimed is:

1. In a gaseous core nuclear reactor of the type wherein a light propellant is heated by diffusion through a heavy fissionable fuel; the improvement comprising
    a hollow housing surrounding the reactor core and having a plurality of tangentially-formed slots therein, said slots forming a communication between the interior of said housing and said core, and
    means for supplying a mixture of the propellant and fuel to said slots whereby said mixture is injected tangentially into the gaseous core to maintain the heavy fissionable fuel outwardly of the core center by centrifugal action.

2. In a gaseous core nuclear reactor of the type wherein a light propellant is heated by diffusing through a heavy fuel; the improvement comprising
    a hollow housing surrounding the reactor core and having a plurality of tangentially-formed slots therein, said slots forming a communication between the interior of said housing and said core,
    an annular manifold encircling said housing for containing a mixture of liquid hydrogen and a gaseous fissionable material, and
    a plurality of injector tubes spaced circumferentially around said housing in communicaiton with said annular manifold for supplying said mixture to said slots whereby said mixture is injected tangentially into the gaseous core to maintain the heavy fissionable fuel outwardly of the core center by centrifugal action.

3. A gaseous core nuclear reactor as claimed in claim 2 wherein the gaseous fissionable material is fully enriched uranium.

4. A gaseous core nuclear reactor as claimed in claim 2 wherein the gaseous fissionable material is plutonium.

5. A method of improving the hold-up time of a heavy fissionable fuel in a gaseous core nuclear reactor of the type wheerin a light propellant is heated by diffusing through the fuel comprising
    mixing the fuel and propellant outwardly of the core, and
    injecting the resulting mixture tangentially into the core so that the heavy fissionable fuel is maintained outwardly of the core center by centrifugal action.

6. Apparatus for improving the hold-up time of a heavy fissionable fuel in a gaseous core nuclear reactor of the type wherein a light propellant is heated by diffusing through the fuel comprising
    means for mixing the fuel and propellant outwardly of the core, and
    means for injecting the resulting mixture tangentially into the core so that the heavy fissionable fuel is maintained outwardly of the core center by centrifugal action.

7. A nuclear rocket motor comprising
    an outer shell;
    a cylindrical housing within and operatively associated with said shell, the interior of said housing forming the combination chamber of said rocket motor;
    means for feeding a mixture of a liquid fuel and fissionable material tangentially into said combustion chamber so as to form an annular cylindrical gaseous vortex of fissionable material therein; and
    a cooled exhaust means rigidly attached to said outer shell.

8. A nuclear rocket motor comprising
    an outer shell;
    a housing within and operatively associated with said shell, said housing enclosing a combustion chamber and having a plurality of tangentially-formed slots for feeding a mixture of liquid fuel and fissionable material tangentially into said combustion chamber whereby an annular cylindrical gaseous vortex of fissionable material is formed therein; and a cooled exhaust means rigidly attached to said outer shell.

9. A nuclear rocket motor comprising an outer shell;

a housing situated within and operatively associated with said shell, the interior of said housing containing a reactor core;

means for feeding a mixture of a liquid fuel and fissionable material tangentially into said reactor core whereby an annular cylindrical gaseous vortex of fissionable material is formed therein; and a double-walled exhaust nozzle rigidly attached to said outer shell whereby a portion of the liquid fuel is caused to pass through said double walls to cool said nozzle prior to said fuel being admitted to said housing.

10. A nuclear rocket motor comprising an outer shell;

a housing situated within and operatively associated with said shell, the interior of said housing comprising a combustion chamber; means for feeding a mixture of a liquid fuel and fissionable material tangentially into said housing whereby an annular cylindrical gaseous vortex of fissionable material is formed therein;

a plurality of control motors to actuate control rods attached thereto, said motors and control rods being rigidly attached to said housing; and a cooled exhaust means rigidly attached to said shell.

References Cited by the Examiner

Nucleonics, July 1958, pp. 62–69, 73 and 74.

REUBEN EPSTEIN, *Primary Examiner.*